US010615457B2

(12) United States Patent
Hwang et al.

(10) Patent No.: US 10,615,457 B2
(45) Date of Patent: Apr. 7, 2020

(54) ELECTROLYTE SYSTEM FOR HIGH VOLTAGE LITHIUM ION BATTERY

(71) Applicant: SES Holdings Pte. Ltd., Singapore (SG)

(72) Inventors: Jaehee Hwang, Burlington, MA (US); Xiaobo Li, Framingham, MA (US); Qichao Hu, Somerville, MA (US)

(73) Assignee: SES Holdings Pte. Ltd., Singapore (SG)

( * ) Notice: Subject to any disclaimer, the term of this patent is extended or adjusted under 35 U.S.C. 154(b) by 0 days.

(21) Appl. No.: 15/049,528

(22) Filed: Feb. 22, 2016

(65) Prior Publication Data

US 2016/0248122 A1   Aug. 25, 2016

Related U.S. Application Data

(60) Provisional application No. 62/120,576, filed on Feb. 25, 2015.

(51) Int. Cl.
H01M 10/0569 (2010.01)
H01M 4/38 (2006.01)
H01M 10/0568 (2010.01)
H01M 4/66 (2006.01)
H01M 10/052 (2010.01)

(52) U.S. Cl.
CPC ....... H01M 10/0569 (2013.01); H01M 4/382 (2013.01); H01M 4/661 (2013.01); H01M 10/052 (2013.01); H01M 10/0568 (2013.01); H01M 2300/0025 (2013.01); Y02T 10/7011 (2013.01)

(58) Field of Classification Search
CPC ......... H01M 10/0569; H01M 10/0525; H01M 10/0568; H01M 4/382; H01M 2300/0037; H01M 4/502; H01M 4/661; H01M 2/0285; H01M 2/26; H01M 6/166
See application file for complete search history.

(56) References Cited

U.S. PATENT DOCUMENTS 5,824,434 A   10/1998  Kawakami et al.
6,168,884 B1   1/2001  Neudecker et al.
6,733,924 B1   5/2004  Skotheim et al.
(Continued)

FOREIGN PATENT DOCUMENTS

CN    1434536 A    8/2003
CN    1630959 A    6/2005
(Continued)

OTHER PUBLICATIONS

Qian et al ("High Rate and stable cycling of lithium metal anode" Nature Comm. 6, article No. 6362 p. 1-9) (2015).*
(Continued)

Primary Examiner — Stephen J Yanchuk
(74) Attorney, Agent, or Firm — Downs Rachlin Marin PLLC

(57) ABSTRACT

A secondary high energy density lithium ion cell includes a cathode comprising a high voltage cathode active material, a lithium metal anode, and a non-aqueous electrolyte, wherein the non-aqueous electrolyte comprises an imide salt with a fluorosulfonyl group and a perchlorate salt, wherein the electrolyte is electrochemically stable at operating voltages greater than 4.2V.

25 Claims, 8 Drawing Sheets

(56) References Cited

U.S. PATENT DOCUMENTS

| | | |
|---|---|---|
| 6,797,428 B1 | 9/2004 | Skotheim et al. |
| 7,247,408 B2 | 7/2007 | Skotheim et al. |
| 7,282,295 B2 | 10/2007 | Visco et al. |
| 8,105,717 B2 | 1/2012 | Skotheim et al. |
| 8,197,971 B2 | 6/2012 | Skotheim et al. |
| 8,501,339 B2 | 8/2013 | Visco et al. |
| 8,623,557 B2 | 1/2014 | Skotheim et al. |
| 8,728,661 B2 | 5/2014 | Skotheim et al. |
| 8,753,771 B2 | 6/2014 | Skotheim et al. |
| 8,828,580 B2 | 9/2014 | Visco et al. |
| 9,065,149 B2 | 6/2015 | Skotheim et al. |
| 9,368,775 B2 | 6/2016 | Visco et al. |
| 9,397,342 B2 | 7/2016 | Skotheim et al. |
| 9,653,735 B2 | 5/2017 | Skotheim et al. |
| 2003/0113622 A1 | 6/2003 | Blasi et al. |
| 2008/0233467 A1* | 9/2008 | Issaev .............. H01M 4/382 429/50 |
| 2012/0100413 A1* | 4/2012 | Okano ............ H01M 2/0207 429/152 |
| 2012/0244425 A1 | 9/2012 | Tokuda |
| 2012/0258357 A1 | 10/2012 | Kim |
| 2013/0236764 A1 | 9/2013 | Hu et al. |
| 2013/0323607 A1* | 12/2013 | Issaev .............. H01M 2/1653 429/338 |
| 2014/0011099 A1 | 1/2014 | Yang et al. |
| 2014/0248529 A1 | 9/2014 | Chen et al. |
| 2014/0272605 A1 | 9/2014 | Lim et al. |
| 2014/0342249 A1 | 11/2014 | He et al. |
| 2015/0050563 A1 | 2/2015 | Yamada et al. |
| 2015/0318552 A1 | 11/2015 | Skotheim et al. |
| 2016/0164137 A1* | 6/2016 | Moganty .......... H01M 10/0565 429/306 |

FOREIGN PATENT DOCUMENTS

| | | |
|---|---|---|
| CN | 103474698 A | 12/2013 |
| CN | 103579677 A | 2/2014 |
| JP | 2003208925 A | 7/2003 |
| JP | 2005538498 A | 12/2005 |

OTHER PUBLICATIONS

International Search Report and Written Opinion issued by the U.S. Patent and Trademark Office as International Searching Authority for International Application No. PCT/US16/17020 dated May 2, 2016 (10 pgs.).

International Search Report and Written Opinion issued by the U.S. Patent and Trademark Office as International Searching Authority for International Application No. PCT/US16/018866 dated May 3, 2016 (11 pgs.).

Qian, et al., "High Rate and Stable Cycling of Lithium Metal Anode," Nature Communications, vol. 6, pp. 1-9 (2015).

Xu, K., "Nonaqueous Liquid Electrolytes for Lithium-Based Rechargeable Batteries," Chem. Rev., vol. 104, pp. 4303-4417 (2004).

Yamada, et al., "A Superconcentrated Ether Electrolyte for Fast-charging Li-ion Batteries," Chem. Commun., vol. 49, pp. 11194-11196 (2013).

Ding, et al., "Dendrite-Free Lithium Deposition via Self-Healing Electrostatic Shield Mechanism," Journal of the American Chemical Society, vol. 135, pp. 4450-4456 (2013).

Suo, et al., "A New Class of Solvent-in-Salt Electrolyte for High-energy Rechargeable Metallic Lithium Batteries," Nature Communications, vol. 4, pp. 1-9 (2013).

McOwen, et al., "Concentrated Electrolytes: Decrypting Electrolyte Properties and Reassessing Al Corrosion Mechanisms," Energy Environ. Sci., vol. 7, pp. 416-426 (2014).

Wang, et al., "Inhibition of Anodic Corrosion of Aluminum Cathode Current Collector on Recharging in Lithium Imide Electrolytes," Electrochimica Acta, vol. 45, pp. 2677-2684 (2000).

Extended European Search Report dated Jul. 19, 2018 for European Patent No. 16756104.2 (26 pages).

* cited by examiner

ELECTROLYTE SYSTEM FOR HIGH VOLTAGE LITHIUM ION BATTERY

INCORPORATION BY REFERENCE

This application claims benefit under 35 U.S.C. 119(e) to U.S. Provisional Patent Application No. 62/120,576, filed on Feb. 25, 2015, the entirety of which is explicitly incorporated by reference herein.

All patents, patent applications and publications cited herein are hereby incorporated by reference in their entirety. The disclosures of these publications in their entireties are hereby incorporated by reference into this application in order to more fully describe the state of the art as known to those skilled therein as of the date of the invention described herein.

TECHNICAL FIELD

The disclosure relates generally to rechargeable batteries, and more specifically, to rechargeable lithium batteries, and the use of non-aqueous electrolytes with improved properties.

BACKGROUND

Over the past decade, there has been a lot of invention and improvement made for next generation high energy density rechargeable battery materials. High energy density rechargeable battery means the battery can hold and provide more energy compared to conventional lithium ion batteries of the same size, and therefore, cell phones will last longer and the driving range of electric vehicle will increase, making electric vehicles more practical and attractive.

Commercial lithium-ion batteries typically have a metal oxide based cathode, a graphite based anode, and a non-aqueous electrolyte. They exhibit a specific energy of ~250 Wh/kg and energy density of ~600 Wh/L. However, the current lithium-ion technology cannot satisfy the increasing energy density demands of the future. Lithium metal is an attractive anode material for rechargeable batteries as it offers the highest theoretical specific capacity of 3860 Ah/kg (vs. 370 mAh/g for graphite) and the lowest negative electrochemical potential (−3.04 V vs. SHE), of all metals. Substituting the graphite anode in lithium-ion batteries with metallic lithium can potentially enhance the overall energy density of the battery above 1000 Wh/L.

In a secondary battery utilizing a lithium anode, its electrolyte materials and compositions must show high cycling efficiency and safety in its electrolyte system to deliver high performance battery with long cycle life. In order to achieve high cycling efficiency of a cell, not only the electrolyte efficiency must be high, but also the electrochemical cell parts that is in contact with electrolyte must be electrochemically stable within the electrochemical testing voltage window to prevent any side reaction and degradation of the cell hardware or other cell components. Aluminum foils are used as the primary cathode current collector material in secondary lithium ion batteries over other metal foils due to its light weight, electrical conductivity, workability, and low cost of the material, and therefore new electrolyte materials should be both chemically and electrochemically stable within the battery charging and discharging voltage.

SUMMARY

An electrolyte is provided for a lithium ion battery that is both chemically and electrochemically stable. In one or more embodiments, the electrolyte is electrochemically stable over a wide voltage range, for example, a voltage range of about 3V to 4.5V.

In one or more embodiments, the electrolyte is incorporated into an electrochemical cell that includes cell components, such as the cathode current collector, that are made from aluminum or aluminum alloys or stainless steel. The electrolyte suppresses aluminum or stainless steel corrosion during its use in a lithium ion cell.

In one aspect, the electrochemical cell includes an anode, a cathode and an electrolyte, wherein the cell includes at least one aluminum and/or stainless steel containing component that is in contact with the electrolyte. The electrolyte includes an imide salt, for example, lithium bisfluorosulfonylimide ($LiN(FSO_2)_2$), and a perchlorate salt in an aprotic solvent. Other lithium imide salts with a fluorosulfonyl ($FSO_2$) group, e.g., $LiN(FSO_2)_2$, $LiN(FSO_2)(CF_3SO_2)$, $LiN(FSO_2)(C_2F_5SO_2)$, can be used instead of or in any combination with lithium bisfluorosulfonylimide ($LiN(FSO_2)_2$). The cell cycles stably over a wide voltage range, for example, a voltage range of about 3V to 4.5V, including between about 4.2V to 4.5V.

In another aspect, a method of operating a high energy density rechargeable lithium battery includes cycling the battery at room temperature over a wide range of voltage, for example, 3V to 4.5V, without causing corrosion of cathode current collector employing non-aqueous electrolytes composed of LiFSI salt as a main salt in organic solvent and a perchlorate corrosion inhibitor.

One aspect of the present disclosure relates to a secondary high energy density lithium ion cell. The secondary high energy density lithium ion cell may include a cathode including a high voltage cathode active material; a lithium metal anode; and a non-aqueous electrolyte, wherein the non-aqueous electrolyte includes an imide salt with a fluorosulfonyl group and a perchlorate salt, wherein the electrolyte is electrochemically stable (e.g., as defined by behavior of cyclic voltammogram curves) at operating voltages greater than 4.2V.

In some embodiments, the system is cycled at charge and discharge rates of about 0.1 C-2 C, for example, about 0.7 C charge and about 0.5 C discharge. In some embodiments, cycling comprises cycling the cell to a voltage of about 4.5V. In some embodiments, the charging voltage is about 4.5V. In some embodiments, a system is considered electrochemically stable when (1) a reduction of greater than about 85%, 90%, 95%, 96%, 97%, 98%, 99%, 99.5%, 99.6%, 99.9% of accumulated charge is achieved at high voltages (e.g., above 4.2V, e.g., 4.5V) for extended time periods (e.g., several hours, e.g., greater than 10 hours) and for multiple continuous voltammetry cycles (e.g., five or more cycles) as compared to electrolytes with no perchlorate and/or (2) the battery exhibits discharge capacity of at least 80% after 4 or more cycles. Some embodiments described herein relate to batteries that exhibit discharge capacity of at least about 80% after at least 5 cycles, 10 cycles, 20 cycles, 25 cycles, 40 cycles, 50 cycles, 60 cycles, 70 cycles, 80 cycles, 90 cycles, 100 cycles, 110 cycles, 120 cycles, 130 cycles, 150 cycles.

In some embodiments, the imide salt includes LiFSI. In some embodiments, the imide salt consists essentially of LiFSI.

In some embodiments, the perchlorate salt includes $LiClO_4$. In some embodiments, the perchlorate salt has a concentration between 0.05M to 0.50M of the organic solvent. In some embodiments, the perchlorate salt includes $LiClO_4$. In some embodiments, the perchlorate salt has a concentration between 0.25M to 0.50M of the organic solvent. In some embodiments, the perchlorate salt includes $LiClO_4$. In some embodiments, the perchlorate salt has a concentration between 0.35M to 0.45M of the organic solvent. In some embodiments, the perchlorate salt is selected from the group consisting of: $LiClO_4$, $Ca(ClO_4)_2$, $Sr(ClO_4)_2$, $Mg(ClO_4)_2$, $Ba(ClO_4)_2$, and any combinations or mixtures thereof. In some embodiments, the perchlorate salt comprises $LiClO_4$ and one or more perchlorate salts comprising an alkaline earth metal.

In some embodiments, the electrolyte has an imide salt concentration between 2 to 10 moles/liter of the organic solvent. In some embodiments, the electrolyte has an imide salt concentration exceeding 2 moles/liter of the organic solvent. In some embodiments, the electrolyte has an imide salt concentration between 2 to 3 moles/liter of the organic solvent. In some embodiments, the electrolyte has an imide salt concentration between 2 to 4 moles/liter of the organic solvent. In some embodiments, the electrolyte has an imide salt concentration between 4 to 6 moles/liter of the organic solvent. In some embodiments, the electrolyte has an imide salt concentration between 3 to 7 moles/liter of the organic solvent.

In some embodiments, the electrolyte has an imide salt concentration between 2 to 3 moles/liter of the organic solvent, wherein the organic solvent is, includes, or consists essentially of ethylene carbonate. In some embodiments, the electrolyte has an imide salt concentration between 2 to 4 moles/liter of the organic solvent, wherein the organic solvent is, includes, or consists essentially of ethylene carbonate. In some embodiments, the electrolyte has an imide salt concentration between 4 to 6 moles/liter of the organic solvent, wherein the organic solvent is, includes, or consists essentially of dimethoxyethane. In some embodiments, the electrolyte has an imide salt concentration between 3 to 7 moles/liter of the organic solvent, wherein the organic solvent is, includes, or consists essentially of dimethoxyethane.

In some embodiments, the electrolyte includes a cyclic carbonate such as ethylene carbonate or propylene carbonate, their derivatives, and any combinations or mixtures thereof, as organic solvent. In some embodiments, the electrolyte includes a glyme such as dimethoxyethane, diethoxyethane, triglyme, or tetraglyme, their derivatives, and any combinations or mixtures thereof, as organic solvent. In some embodiments, the electrolyte includes a cyclic ether such as tetrahydrofuran or tetrahydropyran, their derivatives, and any combinations or mixtures thereof, as organic solvent. In some embodiments, the electrolyte comprises an ether such as diethylether or methylbutylether, their derivatives, and any combinations or mixtures thereof, as organic solvent.

In some embodiments, the anode is a lithium metal foil pressed on a current collector such as a copper foil or mesh. In some embodiments, the anode is a current collector having a vapor-deposited lithium layer and lithium is subsequently plated on it during the first charge of the battery. In some embodiments, the anode has lithium foil thickness ranging from 0.1 to 100 microns, preferentially between 5 to 50 microns.

In some embodiments, the cathode is a high voltage cathode electrochemically stable at or above 4.4V. In some embodiments, the cathode is a high voltage cathode electrochemically stable at or above 4.5V.

In some embodiments, the cell includes at least one surface in contact with the electrolyte, the surface comprising aluminum, aluminum alloy, or stainless steel. In some embodiments, the cell includes an aluminum containing cathode current collector. In some embodiments, the cell includes a stainless steel containing form factor.

In some embodiments, the electrolyte is chemically stable with the lithium metal anode. In some embodiments, chemical stability is defined as lack of (or minimal presence of) undesired reactions between lithium metal anode and the electrolyte. Undesired reactions may include, for example, formation of films on the lithium metal, discoloration of lithium metal, dissolution of the lithium metal in the electrolyte, discoloration of the electrolyte, precipitation of electrolyte material.

A further aspect of the present disclosure relates to a method of operating a high energy density lithium ion cell. The method may include providing a high energy density lithium ion cell as discussed above and cycling the cell at least once in a voltage range exceeding 4.2V, exceeding 4.3V, or exceeding 4.4V, including the voltage range 4.2V-4.5V.

In some embodiments, the cell is cycled at 0.7 C charge and at 0.5 C discharge. In some embodiments, cycling comprises cycling the cell to a voltage of 4.5V. In some embodiments, the charging voltage is 4.5V.

Elements of embodiments described with respect to a given aspect of the invention may be used in various embodiments of another aspect of the invention. For example, it is contemplated that features of dependent claims depending from one independent claim can be used in apparatus and/or methods of any of the other independent claims.

DETAILED DESCRIPTION

Figure 1:
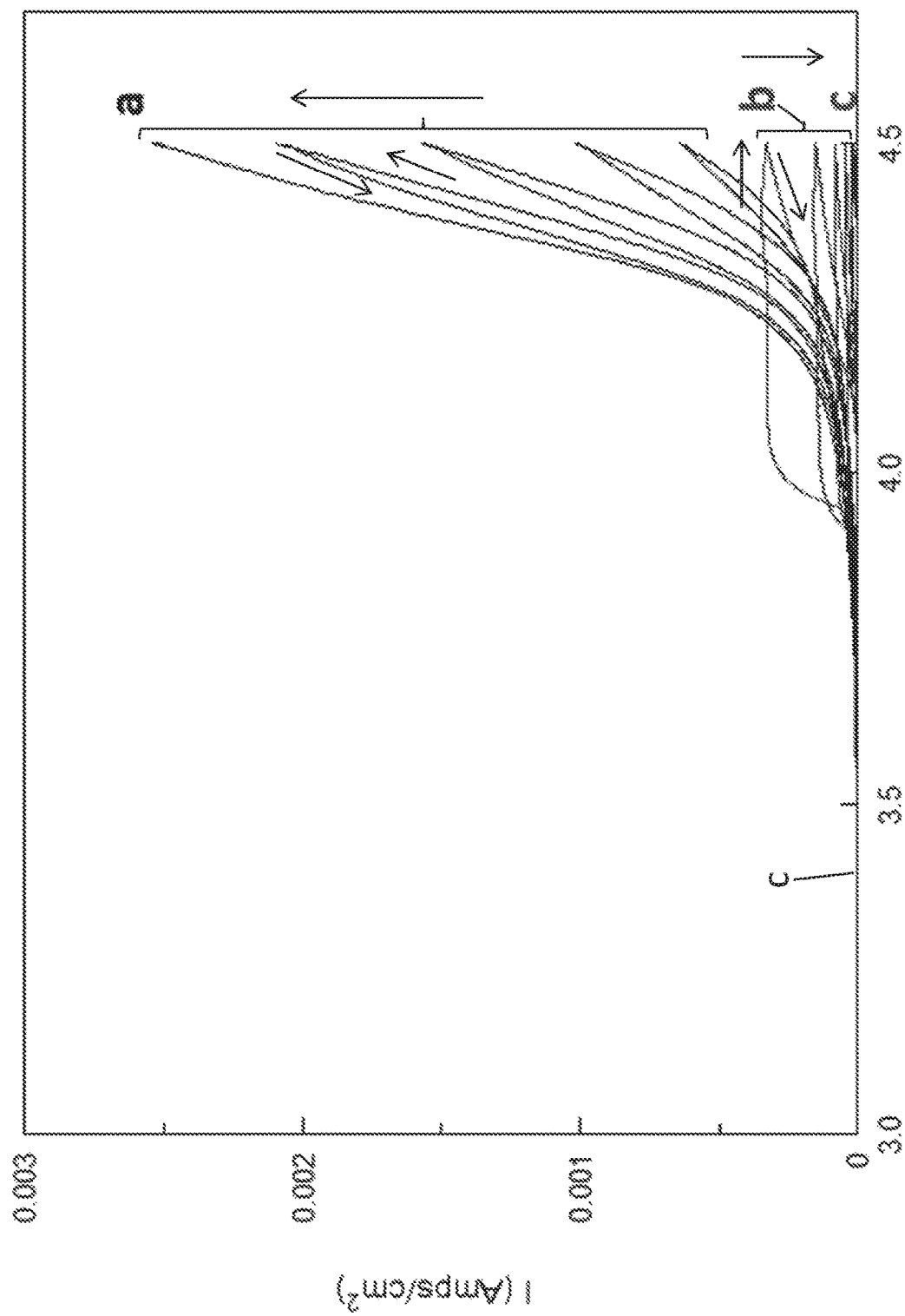
FIG. 1 is a current density ($A/cm^2$) vs. SS potential (V, vs. Li) diagram employing LiFSI in EC electrolyte with different amount of $LiClO_4$, according to some aspects of the present disclosure.

Some embodiments disclosed herein relate to batteries, in particular rechargeable (secondary) batteries with a lithium anode, that exhibit improved anti-corrosive properties over a full range of operating voltages. The battery may be a secondary high energy density lithium ion cell. The battery may include a cathode, a lithium metal anode, and a non-aqueous electrolyte. The electrolyte inhibits corrosion of surfaces that are in contact with the electrolyte, for example, surfaces including stainless steel, aluminum, or aluminum alloys. The cathode may include a high voltage cathode active material. The non-aqueous electrolyte may include a solvent and a combination of two or more salts. The salts may include an imide salt and a perchlorate salt. The imide salt may be or include a fluorosulfonyl group. The non-aqueous electrolyte may be electrochemically stable at operating voltages between 3V and 4.5V. The non-aqueous electrolyte may be chemically stable with the lithium metal anode.

Some embodiments discussed herein demonstrate a design of rechargeable batteries that include components selected to achieve optimal chemical and electrochemical performance and stability of such batteries. Some embodiments discussed herein relate to batteries that include components selected to minimize corrosion and to ensure successful battery performance at a wide range of operating voltages, e.g., between 3V-4.5V, including high operating voltages between 4.2V-4.5V. The electrolyte may be selected to achieve electrochemical stability at operating voltages greater than about 4.2V. The electrolyte may include a combination of two or more salts and an organic solvent, the components being selected to achieve electrochemical stability at operating voltages between 3-4.5V, and particularly above 4.2V. The electrolyte may be selected to achieve optimal chemical performance and stability with the lithium metal anode. The electrolyte may include a combination of two or more salts and an organic solvent, where each of the salts and the organic solvent, and the concentration of each of the salts are selected to achieve electrochemical stability at operating voltages greater than about 4.2 V. One of the salts may be or include an imide salt (e.g., an imide salt with a fluorosulfonyl group) or a combination of imide salts. A second salt may be or include a perchlorate or a combination of perchlorates.

In some embodiments, the electrolyte may have a high imide salt concentration. In some embodiments, the imide salt concentration is higher than about 2 moles/liter of the organic solvent. In some embodiments, the imide salt concentration is between about 2 moles/liter and about 10 moles/liter.

In some embodiments, the organic solvent is or includes a cyclic carbonate (e.g., ethylene carbonate (EC) or propylene carbonate, their derivatives, and any combinations or mixtures thereof). In some embodiments, the organic solvent is or includes a cyclic ether such as tetrahydrofuran (THF) or tetrahydropyran (THP), their derivatives, and any combinations and mixtures thereof. In some embodiments, the organic solvent is or includes a glyme such as dimethoxyethane (DEOE) or diethoxyethane (DEE), their derivatives, and any combinations and mixtures thereof. In some embodiments, the organic solvent is or includes an ether such as diethylether (DEE) or methylbutylether (DME), their derivatives, and any combinations and mixtures thereof as the organic solvent. These and additional solvents, and batteries utilizing such solvents are discussed in International Patent Application No. PCT/US16/17020, filed on Feb. 6, 2016, which is incorporated herein by reference in its entirety.

Lithium bisfluorosulfonylimide ($LiN(FSO_2)_2$ or LiFSI salt is a new and promising salt for rechargeable lithium battery electrolyte as it exhibits favorable electrochemical and chemical properties such as high conductivity, superior stability towards hydrolysis than $LiPF_6$ used in conventional Li-ion battery electrolytes, large electrochemical window, and high solubility in organic solvent, for its application in rechargeable lithium ion battery electrolytes for high voltage cathode, such as lithium cobalt oxide. LiFSI salt (with a medium-sized imide anion), was found to have high solubility, without much compromise in electrolyte conductivity, which consequently improves the electrochemical cycling performance of the lithium metal battery. Despite advantageous properties of LiFSI over $LiPF_6$ salt, one of the biggest hurdles to overcome before commercialization of electrolytes containing LiFSI is its nature to corrode aluminum (or stainless steel) current collector at highly oxidizing voltage associated with high voltage cathode. Generally, the corrosive effects become more pronounced at higher voltages. It has been surprisingly discovered that the addition of a perchlorate salt can inhibit metal corrosion without interfering with cell operation.

According to one or more embodiments, a salt containing a perchlorate anion ($ClO_4^-$) in the electrolyte can be used to inhibit metal corrosion, e.g., aluminum corrosion of cathode current collector. In exemplary embodiments, the perchlorate salt can be lithium perchlorate $LiClO_4$, or an alkaline earth metal perchlorate such as $Ca(ClO_4)_2$, $Sr(ClO4)_2$, $Mg(ClO_4)_2$, $Ba(ClO_4)_2$, or mixtures of any of the above. The concentration of the perchlorate salt can be, for example, between about 0.05M (mol/L) to about 0.50M (mol/L), for example between 0.05M (mol/L) to 0.1M (mol/L), 0.05M (mol/L) to 0.2M (mol/L), 0.1M (mol/L) to 0.3M (mol/L), 0.25M (mol/L) to 0.4M (mol/L), 0.35M (mol/L) to 0.5M (mol/L). Combinations of both $LiClO_4$ and perchlorate salt(s) with alkaline earth metal can be employed in electrolytes.

In some embodiments, $LiClO_4$ in ethylene carbonate (EC) is used without additional salts that can prevent corrosion (e.g., Al or SS corrosion). In some embodiments, the salts added to prevent corrosion, e.g., $LiClO_4$, are used as sacrificial agents to preferentially react on the electrode surface (e.g., Al or SS electrode surface) within the first several cycles forming stable blocking (passivation) surface films. For example, where $LiClO_4$ is used to inhibit Al corrosion, $Al(ClO_4)_3$ surface film is formed. In some embodiments, combinations of two or more salts may be used to prevent corrosion (e.g., Al or SS corrosion). In some embodiments, a $LiClO_4$ salt is used in combination with one or more additional salts to enhance the anti-corrosion effects. In some embodiments, the additional salt (e.g., in addition to the $LiClO_4$ salt) for inhibiting corrosion is selected based on its compatibility with the anode. In some embodiments, the additional salt (e.g., in addition to the $LiClO_4$ salt) for inhibiting corrosion is selected based on its effectiveness in passivating the electrode material. In some embodiments, additional salts that can prevent Al corrosion for LiFSI include, but are not limited to, $LiPF_6$, lithium difluoro (oxalato)borate (LiDFOB), and lithium bis(oxalato)borate (LiBOB). In some embodiments, the concentration of the additional salt, such as, for example, LiDFOB or LiBOB or the concentration of the additional salt with anion, such as, for example, DFOB or BOB, can be, for example, between about 0.05M (mol/L) to about 1.0 M (mol/L).

The electrolyte includes an ionically conductive salt having a good ionic conductivity, superior stability towards hydrolysis, large electrochemical window, and high solubility in organic solvent. In one or more embodiments, the salt is an imide salt with a fluorosulfonyl ($FSO_2$) group, e.g., ($LiN(FSO_2)_2$, $LiN(FSO_2)_2$, $LiN(FSO_2)(CF_3SO_2)$, and/or LiN(FSO$_2$)(C$_2$F$_5$SO$_2$) and any combination or mixture thereof. The salt is stable over 4.2V and, in particular, stable up to about 4.5V.

Any aprotic solvent typically used in lithium ion battery cells can be used in the electrolytes described herein. For example, the electrolyte can have an imide salt concentration of between about 2 to 10 moles/liter of the organic solvent. The actual concentration of LiFSI will depend on the particular application of the battery—for example, for mobile phones and small device markets. For example, where room temperature operation is required and moderate charging and discharging speed is desired, the optimum concentration of LiFSI salt is typically between about 1.5 to 5 moles/liter, depending on the organic solvent employed. Higher lithium salt concentration in lithium ion battery electrolytes will enhance the lithium ion transference number, which will result in larger amount of available lithium-ion flux. The lithium ionic mass transfer rate between metallic lithium electrode and electrolyte will raise and this can result in enhancement of the uniformity of lithium deposition and dissolution in charge/discharge process. Lithium salt molarity over 5 moles/liter in majority of organic solvents will, however, result in electrolytes with high viscosity that may prevent battery from cycling at high charge-discharge C rate at room temperature. The International Patent Application No. PCT/US16/17020, filed on Feb. 6, 2016, discusses several electrolytes with high salt concentrations (e.g., higher than 5 moles/liter) that may successfully be used in rechargeable lithium batteries.

In other embodiments, the electrolyte can contain a cyclic carbonate such as ethylene carbonate or propylene carbonate, their derivatives, and any combinations or mixtures thereof, as organic solvent. Exemplary solvents include glymes such as dimethoxyethane, triglyme, or tetraglyme, their derivatives, and any combinations or mixtures thereof, as organic solvent. Cyclic ethers, such as tetrahydrofuran or tetrahydropyran, their derivatives, and any combinations or mixtures thereof may be used. In some implementations, generally poor oxidative stability of tetrahydrofuran and tetrahydropyran above 4.4V makes these solvents somewhat less desirable as solvents.

It has been surprisingly discovered that a method of inhibiting metal corrosion (e.g., corrosion of stainless steel (SS), aluminum (Al), or aluminum alloys) includes increasing the salt concentration of the non-aqueous electrolyte to reduce the solubility of the corrosion product, e.g., Al corrosion product, e.g., Al(FSI)$_3$. However, increasing salt concentration in an electrolyte system to inhibit corrosion is not always feasible for different cell cycling conditions (almost always determined by the particular application of the battery) and electrolyte solvent systems. A higher salt concentration increases the viscosity and decreases the ionic conductivity of the electrolyte, which in turn leads to a higher cell impedance. In some embodiments, the current disclosure relates to systems and methods for providing low cell impedance, allowing the cell to operate at high C rates. It has surprisingly been discovered that increasing lithium imide salt concentration (e.g., increasing the lithium imide salt concentration above about 1.5 or 2 moles/liter) in the electrolyte that includes an organic solvent and a perchlorate salt, enhances anti-corrosive properties of the electrolyte and allows battery operation at high voltages above 4.2V. Further, it was surprisingly found that the design of the electrolytes can be optimized in such a way that the battery can operate at a wide range of C rates between at least about 0.1 C and about 2 C, even with high imide salt concentration (e.g., concentrations above about 1.5 or 2 moles/liter) in the electrolyte. In some embodiments, the charge and discharge rates for the battery are between 0.1 C and 2 C, e.g., 0.1 C to 0.5 C, 0.2 C to 0.8 C, 0.5 C-1 C, 0.75 C to 1.25 C, 1.1 C-1.5 C, 1.25 C-1.6 C, 1.5 C-1.75 C, 1.6 C-1.8 C, 1.75 C-2 C. In some embodiments, the charging rate is 0.7 C. In some embodiments, the discharging rate is 0.5 C. In some embodiments, the charging rate is higher than the discharging rate.

In some embodiments, the electrolyte of the battery can be optimized in such a way that a robust protective film (e.g., Al(ClO$_4$)$_3$) forms on the electrode, suppressing the corrosion reaction such that cycle life is not compromised due to corrosion of the current collector. By way of example, in some embodiments, an electrochemical cell with stainless steel working electrode with lithium metal foil as a reference and counter electrode employing LiFSI in EC electrolyte with added LiClO$_4$ showed almost no sign (or negligible sign) of anodic dissolution of aluminum after five continuous cyclic voltammetry cycles of forming this protective passivation film on SS metal. The accumulated electric charge (in Coulomb, C/cm$^2$), after holding constant voltage at 4.5V for 11 hours after five continuous cyclic voltammetry cycles of forming a protective passivation film on the stainless steel working electrode, in electrochemical cell with no LiClO$_4$ salt was about 230 C/cm$^2$ whereas the addition of 0.0235M LiClO$_4$ to the LiFSI containing host electrolyte significantly decreased this value to 8 C/cm$^2$, and the addition of 0.5M LiClO$_4$ to the LiFSI containing host electrolyte further decreased this value to below 1 C/cm$^2$, indicating this protective film is also stable over time even at high voltage of 4.5V (vs. Li/Li). This is exemplified in FIG. 3.

In some embodiments, the addition of an appropriate amount of perchlorate (e.g., LiClO$_4$ alone or in combination with other suitable salts) enables a reduction of greater than about 85%, 90%, 95%, 96%, 97%, 98%, 99%, 99.5%, 99.6%, 99.9% of accumulated charge at high voltages (e.g., above 4.2V, e.g., 4.5V) for extended time periods (e.g., several hours, e.g., greater than 10 hours) and for multiple continuous voltammetry cycles (e.g., five or more cycles) as compared to electrolytes with no perchlorate. In some embodiments, a system is considered electrochemically stable when a reduction of greater than about 85%, 90%, 95%, 96%, 97%, 98%, 99%, 99.5%, 99.6%, 99.9% of accumulated charge is achieved at high voltages (e.g., above 4.2V, e.g., 4.5V) for extended time periods (e.g., several hours, e.g., greater than 10 hours) and for multiple continuous voltammetry cycles (e.g., five or more cycles) as compared to electrolytes with no perchlorate. In some embodiments, the imide salt concentration in the electrolyte is optimized to achieve maximum reduction (e.g., greater than about 85%, 90%, 95%, 96%, 97%, 98%, 99%, 99.5%, 99.6%, 99.9%) of accumulated charge in the electrochemical cell at high voltages (e.g., above 4.2V, e.g., 4.5V) for extended time periods (e.g., several hours, e.g., greater than 10 hours) and for multiple continuous voltammetry cycles (e.g., five or more cycles). In some embodiments, the solvent or combination of solvents (e.g., DME, EC, THF) is selected to achieve maximum reduction (e.g., greater than about 85%, 90%, 95%, 96%, 97%, 98%, 99%, 99.5%, 99.6%, 99.9%) of accumulated charge in the electrochemical cell at high voltages (e.g., above 4.2V, e.g., 4.5V) for extended time periods (e.g., several hours, e.g., greater than 10 hours) and for multiple continuous voltammetry cycles (e.g., five or more cycles). In some embodiments, the perchlorate salt concentration, the addition of salts other than the perchlorate salt, the imide salt concentration in the electrolyte, and the solvent or combination of solvents are selected to achieve a maximum reduction (e.g., greater than about 85%, 90%, 95%, 96%, 97%, 98%, 99%, 99.5%, 99.6%, 99.9%) of accumulated charge in the electrochemical cell at high voltages (e.g., above 4.2V, e.g., 4.5V) for extended time periods (e.g., several hours, e.g., greater than 10 hours) and for multiple continuous voltammetry cycles (e.g., five or more cycles).

In another example (FIG. 7), the cycle life of lithium ion cell employing lithium metal anode was improved by addition of an appropriate amount of $LiClO_4$ salt. Considering 80% discharge capacity as a cut-off for the determination of cycle life of battery, a lithium ion cell employing LiFSI containing electrolyte without any $LiClO_4$ reached 0 cycles, a lithium ion cell employing LiFSI containing electrolyte with 0.04M $LiClO_4$ addition reached 4 cycles, a lithium ion cell employing LiFSI containing electrolyte with 0.15M $LiClO_4$ addition reached 42 cycles, a lithium ion cell employing LiFSI containing electrolyte with 0.25M $LiClO_4$ addition reached 69 cycles, a lithium ion cell employing LiFSI containing electrolyte with 0.35M $LiClO_4$ addition reached 130 cycles, a lithium ion cell employing LiFSI containing electrolyte with 0.45M $LiClO_4$ addition achieved 109 cycles, and a lithium ion cell employing LiFSI containing electrolyte with 0.50M $LiClO_4$ addition achieved 97 cycles.

Some embodiments described herein relate to batteries that exhibit discharge capacity of at least about 80% after at least 5 cycles, 10 cycles, 20 cycles, 25 cycles, 40 cycles, 50 cycles, 60 cycles, 70 cycles, 80 cycles, 90 cycles, 100 cycles, 110 cycles, 120 cycles, 130 cycles, 150 cycles. In some embodiments, the concentration of the perchlorate salt in the electrolyte is selected to achieve the highest discharge capacity after several cycles of operation. In some embodiments, the concentration of the perchlorate salt and any additional salts in the electrolyte is selected to achieve the highest discharge capacity after several cycles of operation. For example, in some embodiments, the perchlorate salt concentration in the electrolyte between about 0.25M and 0.5M is selected to achieve a discharge capacity of at least about 80% after between about 60-130 cycles. For example, in some embodiments, the perchlorate salt concentration in the electrolyte between about 0.35M and 0.45M is selected to achieve a discharge capacity of at least about 80% after between about 110-130 cycles. In some embodiments, the perchlorate salt concentration, the addition of salts other than the perchlorate salt, the imide salt concentration in the electrolyte, and the solvent or combination of solvents are selected to minimize discharge capacity loss and to maximize the battery cycle life. In some embodiments, a system is considered electrochemically stable if the battery exhibits discharge capacity of at least 80% after 4 or more cycles. In some embodiments, a system is considered electrochemically stable when (1) a reduction of greater than about 85%, 90%, 95%, 96%, 97%, 98%, 99%, 99.5%, 99.6%, 99.9% of accumulated charge is achieved at high voltages (e.g., above 4.2V, e.g., 4.5V) for extended time periods (e.g., several hours, e.g., greater than 10 hours) and for multiple continuous voltammetry cycles (e.g., five or more cycles) as compared to electrolytes with no perchlorate and (2) the battery exhibits discharge capacity of at least 80% after 4 or more cycles.

It has been surprisingly discovered that batteries with an electrolyte that includes an imide salt with a fluorosulfonyl group (e.g., LiFSI), a perchlorate salt, and an organic solvent (e.g., EC, DME, THF, THP, or a combination thereof), as discussed herein, can be operated at voltages above about 4.2V, including up to about 4.5V and can effectively inhibit corrosion. It has been surprisingly discovered that an electrolyte containing a perchlorate additive with an imide salt, e.g., LiFSI conducting salt, in organic solvent is electrochemically stable at cell operating voltages exceeding 4.2V, for example, up to 4.5V. If the electrolyte material is not chemically or electrochemically stable (e.g., stable against corrosion and/or stable against breakdown of the electrolyte, e.g., due to a narrow electrochemical window) in the battery system or with any of the cell hardware in contact with electrolyte, the resulting cell performance will be unsatisfactory. Breakdown of the electrolyte due to a narrow electrochemical window of the electrolyte may lead to lower cycle life and/or may not allow for battery cycling during a specific potential range due to electrolyte degradation. A corrosion reaction may lower cycle life and/or it may not allow for battery cycling if the corrosion reaction occurs within the potential battery cycling range. If the electrolyte is not chemically stable with lithium, as soon as the electrolyte is in contact with a lithium metal anode, the electrolyte will react with the lithium metal to form different SEI products and the electrolyte can degrade even without applying any current. Electrochemical stability is desired because side reactions or decomposition of the electrolyte by either reduction or oxidation reaction within cycling voltage are undesirable. In one or more embodiments, a stable electrolyte provides high cycle life in a lithium ion cell. By way of example, in some embodiments, a lithium ion cell using a lithium metal anode is capable of at least 130 charge/discharge cycles before reaching 80% of initial discharge capacity. Stated differently, in some embodiments, the cell loses no more than 20% of initial capacity after 130 cycles. This property is exemplified in FIG. 7.

Identification of electrolyte compositions suitable for high energy density lithium secondary battery, e.g., about 600 Wh/L, has proven difficult. Electrolytes are required to operate over a wider operating voltage when used in high energy lithium ion batteries. This requirement limits the selection solvents and additives and excludes many materials and material combinations that would routinely and reliably operate at low voltages, e.g., −3.04V (vs. SHE), Li standard reduction potential. Even more challenging is the identification of materials and material combinations that are effective both at low voltage and high voltages, such as 4.4V or 4.5V vs. Li/Li+ (compared to 4.2V). Moreover, in many applications where high energy density batteries are used, such as, for example, mobile phone applications where high C rate (high current density) is applied during battery cycling), the electrolytes are susceptible to side reactions within the cell (for example, corrosion, electrolyte degradation) compared to some other battery systems made for other battery applications. It is therefore advantageous that all the electrolyte components are very stable within themselves or with any cell component(s) that come in contact with the electrolyte. The electrolytes and electrochemical cells disclosed herein have demonstrated chemical and electrical stability when tested in accordance with current Li ion battery for mobile phone testing schedule (e.g., 10 hour resting post electrochemical cell fabrication, the first three formation cycles were done at a low 0.1 C rate, 0.7 C charging to 4.4V, 0.5 C discharging to 3V with 15 min rest after each step, RT cycling), and have demonstrated exceptional performance under these conditions. The ability to effectively operate the battery, as discussed herein, both at high voltages (e.g., above 4.2V, e.g., 4.4V, 4.5V) and at lower voltages (e.g., below 4.2V, below 4.0V, below 3.5V) is an unpredictable and significant advance over prior systems.

FIG. 1 shows Stainless Steel (SS) 316 corrosion behavior observed in LiFSI in an ethylene carbonate (EC) electrolyte: (a) electrolyte without perchlorate salt additive, 2.0M LiFSI in EC (b) 2.0M LiFSI in EC+0.0235M $LiClO_4$, and (c) 2.0M LiFSI in EC+0.5M $LiClO_4$ observed via continuous cyclic voltammetry. Cyclic voltammogram (CV) in curve (a) showed severe corrosion of the SS 316 working electrode and exhibited an opposite behavior as compared to both curve (b) and curve (c). In curve (a), during the continuous CV scans, the current density continued to increase after each cycle indicating higher current generated from the corrosion reaction between the working electrode and the electrolyte material. Also, the higher current density on the reverse scan towards +3.0V supports that what was observed was corrosion behavior. On the other hand, curves (b) and (c) exhibited the highest current density on the first CV cycle and, since perchlorate salt can passivate the surface of SS, the current density decreased as the cycle number of CV scan increased. The forward scan to +4.5V showed a higher current density than its reverse scan on every cycle. The electrolyte employed to produce (c) contained a higher concentration of $LiClO_4$ salt as compared to (b).

Figure 2:
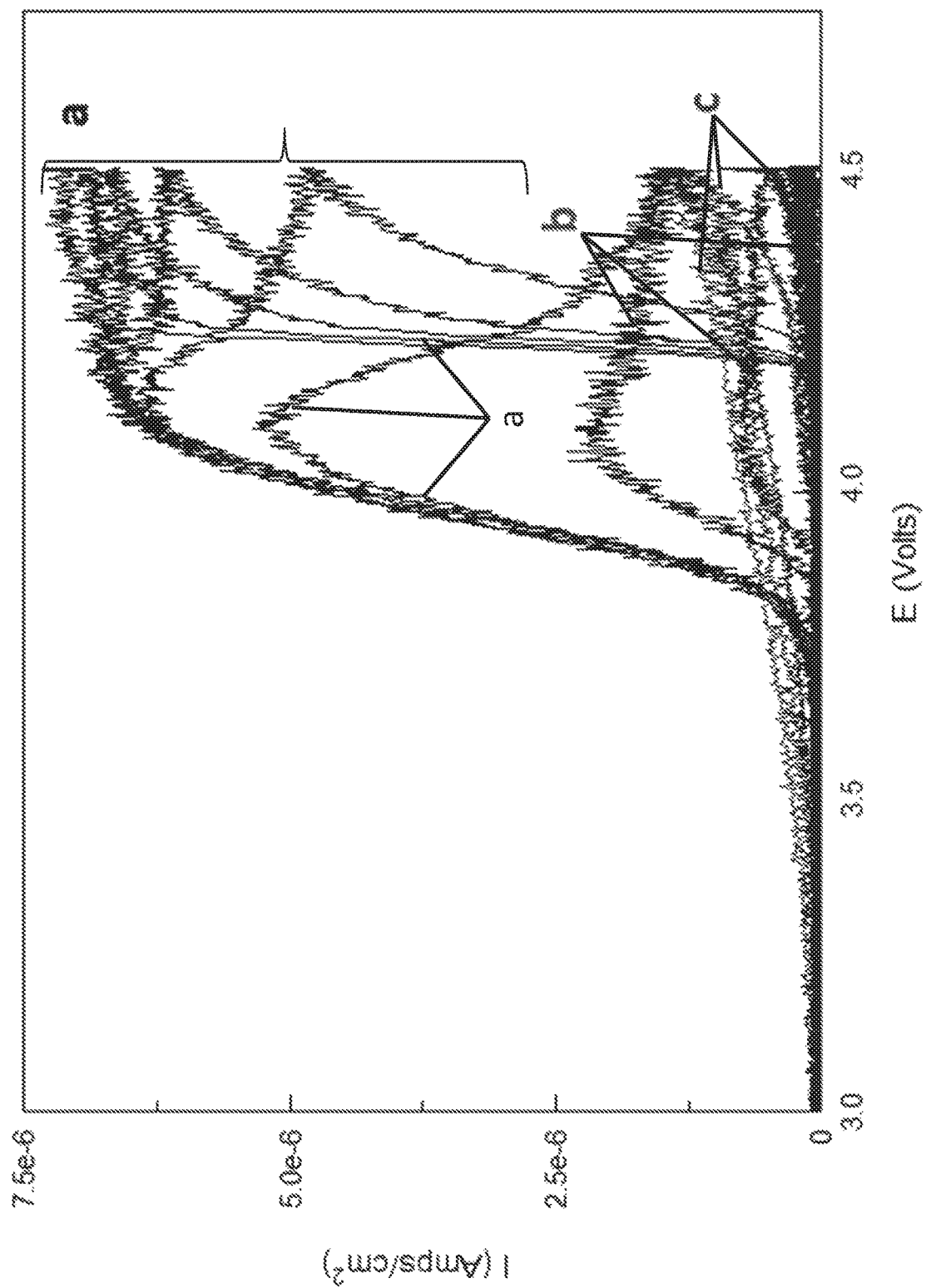
FIG. 2 is a current density ($A/cm^2$) vs. Al potential (V, vs. Li) diagram employing LiFSI in EC electrolyte with different concentration of LiFSI as well as different amount of $LiClO_4$, according to some aspects of the present disclosure.

FIG. 2 is a continuous cyclic voltammogram showing Al corrosion behavior. Curve (a) employed 2.0M LiFSI in EC without $LiClO_4$, whereas curve (c) employed 2.0M LiFSI in EC+0.5M $LiClO_4$ electrolyte. Curve (b) shows behavior tested with 3.0M LiFSI in EC, and illustrates that 3.0M LiFSI in EC is significantly less corrosive towards Al compared to 2.0M LiFSI in EC. As seen curve (c), the oxidative stability of the Al electrode is enhanced with the presence of 0.5M $LiClO_4$ electrolyte.

It has surprisingly been discovered that addition of a corrosion inhibiting salt to the non-aqueous electrolyte containing LiFSI salt allows the cell to operate at high voltage (e.g., greater than about 4.2V) The presence of the corrosion inhibiting salt (e.g., perchlorate salt) or combinations of salts (including combinations with a perchlorate salt) enhances the oxidative stability of an electrode (e.g., Al electrode) and allows for operation at higher voltages, e.g., voltages between 4.2V-4.5V. In cyclic voltammogram (a) in FIG. 2, the electrolyte tested did not contain any perchlorate salt, and therefore, experienced corrosion. The current density continued to increases after each cycle and reverse scan to +3.0V was always higher in current compared to its forward scan to +4.5V for every five cycle, which demonstrates metal corrosion (reaction). As shown in FIG. 2, when LiFSI salt concentration was increased to 3.0M from 2.0M in EC (b), the first cycle exhibited the highest current density and decreased after each cycles until the current density was close to 0, similar to the curve (c). As shown in FIG. 2, when 0.5M $LiClO_4$ is added into 2.0M LiFSI in EC, as in FIG. 1 (c), passivation of aluminum behavior was observed and aluminum corrosion no longer existed in this electrolyte environment. On the first forward scan to +4.5V, passivation film was created protecting aluminum from its corrosion on following cycles, as shown in FIG. 2. In some embodiments, an electrolyte with 2.0M LiFSI in EC and 0.35M $LiClO_4$ can be used.

Figure 3:
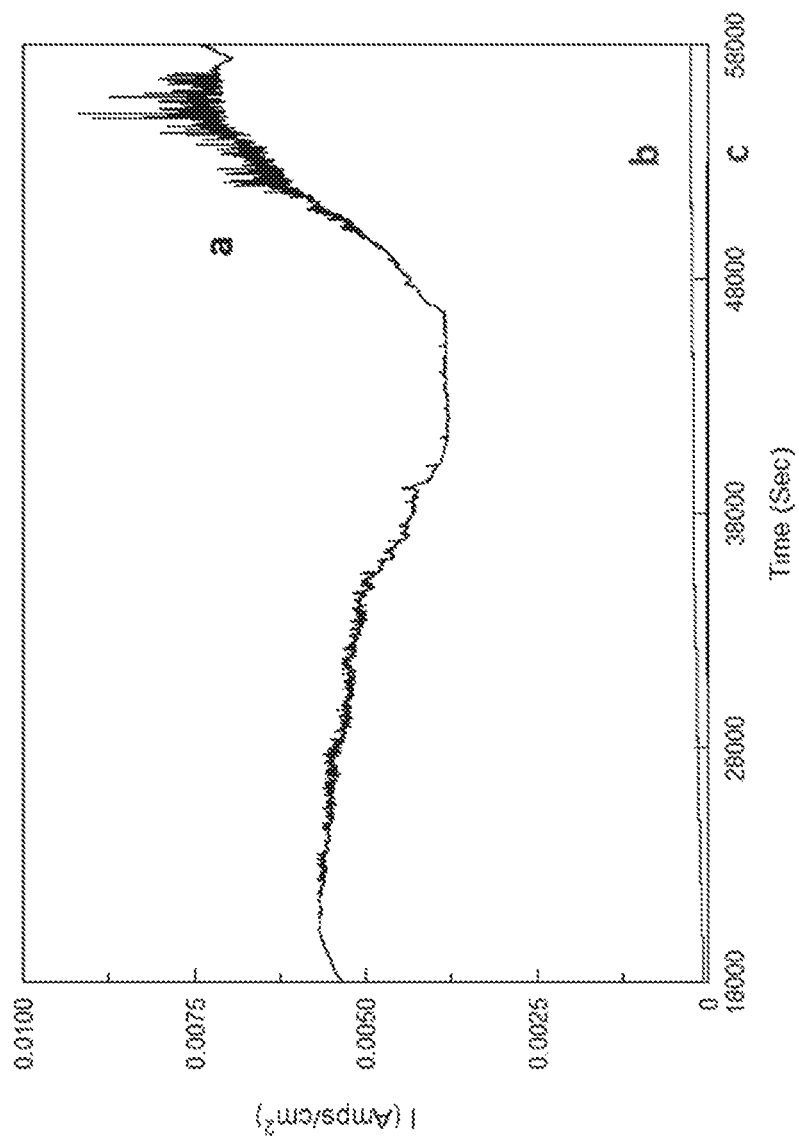
FIG. 3 is a current density ($A/cm^2$) vs. Time (s) diagram when SS potential was held at 4.5V (vs. Li), according to some aspects of the present disclosure.

FIG. 3 shows a relative SS 316 metal corrosion rate when the battery is held at high voltage of +4.5V following the continuous cyclic voltammetry (5 cycles between +3.0V and +4.5V vs. Li/Li+, as shown in FIG. 1) to further evaluate the severity of SS metal corrosion in a more severe testing environment of high voltage. When the working potential was held at +4.5V, (a) 2.0M LiFSI in EC electrolyte continued to cause corrosion of SS, and the complete dissolution of SS foil was observed within about 20 hours in the electrolyte in the absence of $LiClO_4$, as shown in cure (a) of FIG. 3. On the other hand, when 2.0M LiFSI in EC was combined with (b) 0.0235M $LiClO_4$ or (c) 0.5M $LiClO_4$, SS working electrode had been passivated by the presence of perchlorate anion and corrosion of SS was effectively prevented, as shown in curves (b) and (c) of FIG. 3.

Figure 4:
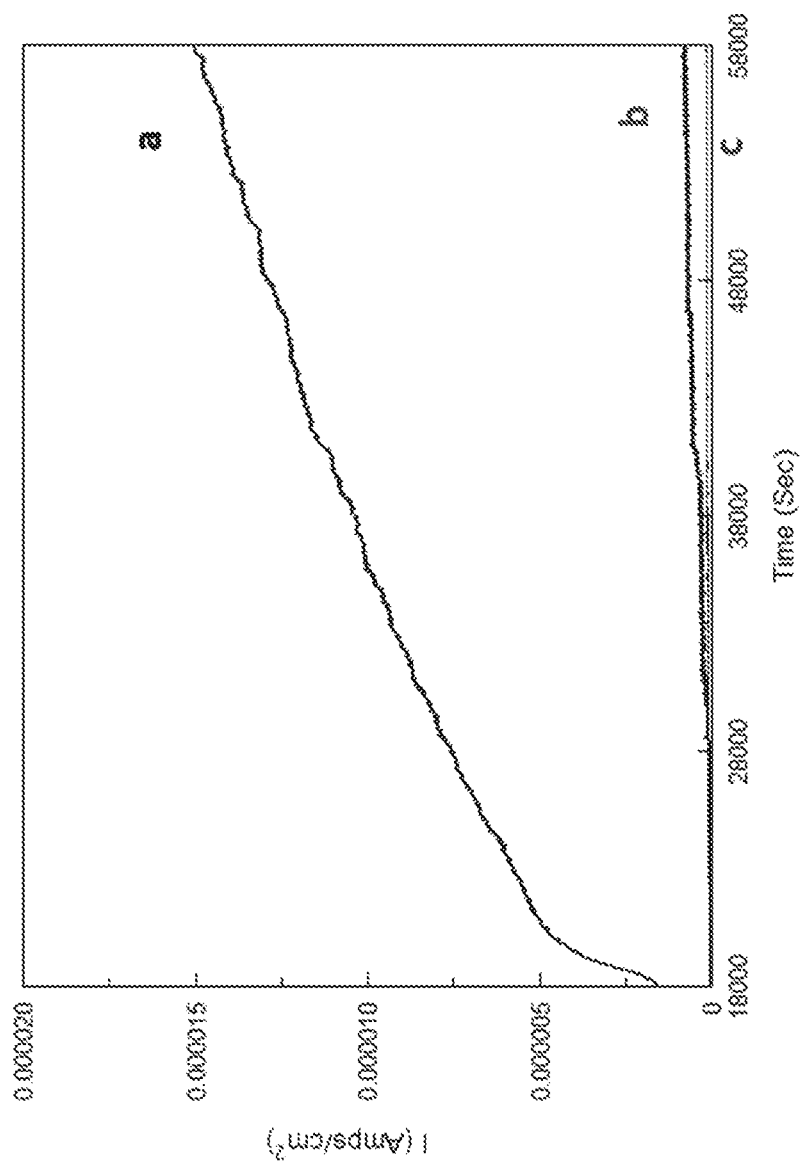
FIG. 4 is a current density ($A/cm^2$) vs. Time (s) diagram when Al potential was held at 4.5V (vs. Li), according to some aspects of the present disclosure.

FIG. 4 shows a current density vs. time plot during potentiostatic hold of aluminum working electrode immediately following the continuous cyclic voltammetry experiment shown in FIG. 2 (the experimental setup is discussed in the Experimental Examples section). With (a) 2.0M LiFSI in EC without any corrosion inhibiting additive, corrosion current and charge accumulated while the working potential was held at +4.5V. Like SS, the complete dissolution of aluminum working electrode occurred after holding potential at +4.5 hr for 24 hours. As shown in curve (b) of FIG. 4, 3.0M LiFSI in EC showed a corrosion rate much slower than that in (a) where LiFSI salt concentration was 2.0M. As shown in curve (c) of FIG. 4, 2.0M LiFSI in EC+0.5M $LiClO_4$ demonstrated the resiliency of the Al passivation film created by adding perchlorate salt; indeed, the current density was less than 1 $uA/cm^2$ and showed that aluminum corrosion was completely suppressed with the addition of perchlorate salt. In some embodiments, $LiClO_4$ is more effective in preventing Al corrosion as compared to $LiPF_6$, LiBOB, or LiDBOB in non-aqueous electrolyte containing LiFSI when the same concentration of LiFSI salt is employed.

Figure 5:
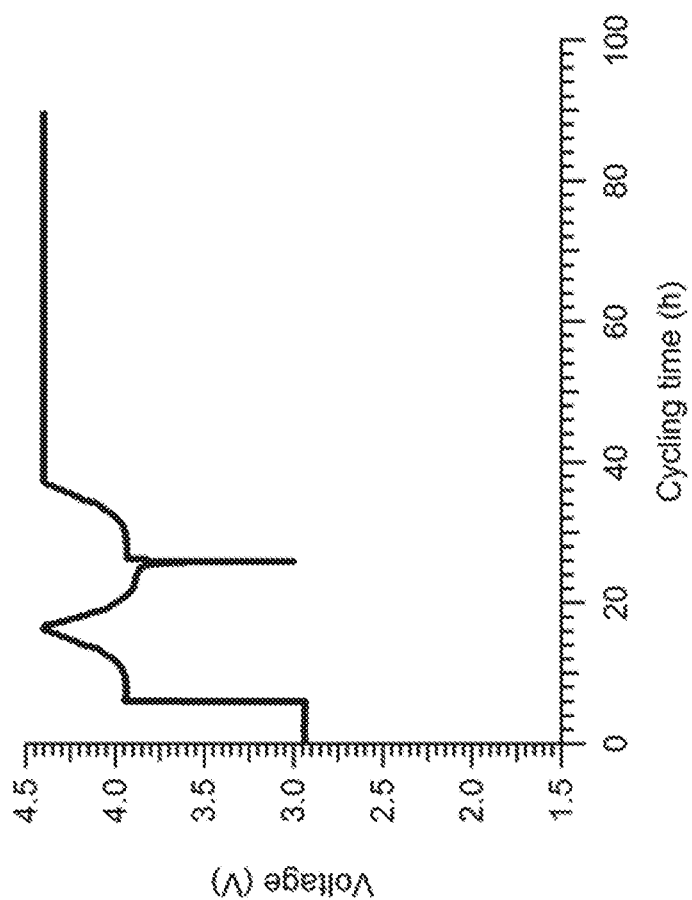
FIG. 5 is a voltage profile vs. Time (s) plot of lithium/$LiCoO_2$ coin cell employing LiFSI in EC electrolyte, according to some aspects of the present disclosure.

FIG. 5 depicts a voltage profile of lithium/$LiCoO_2$ coin cell assembled in Al-clad coin cell parts charged to 4.4V using a battery tester. Due to Al corrosion reaction caused by 2.0M LiFSI in EC electrolyte at high voltage, the cell could not pass the formation cycle. Other replicate cells experienced the same corrosion issue and the cell was damaged. Afterwards, thinned cathode current collector and many black dots on the back of cathode from pit corrosion of Al were observed.

Figure 6:
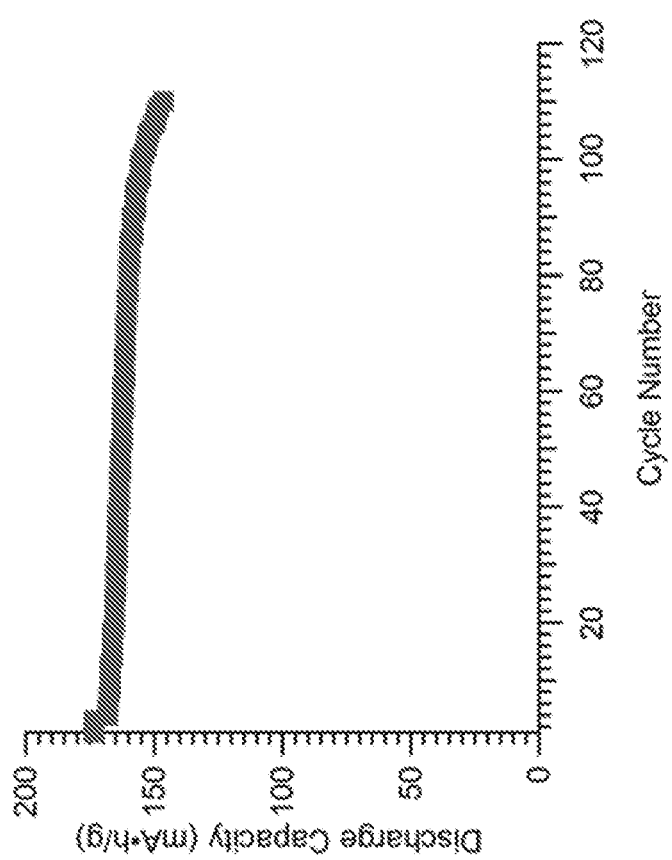
FIG. 6 is a discharge capacity vs. cycle number plot of lithium/$LiCoO_2$ coin cell employing LiFSI in EC electrolyte with $LiClO_4$, according to some aspects of the present disclosure.

In FIG. 6, lithium/$LiCoO_2$ coin cell (Al-clad) was cycled in voltage range of 3.0V and 4.4V. The cathode was a porous coating of lithium cobalt oxide ($LiCoO_2$) particles mixed with a small amount of binder and conductive diluent, on an aluminum current collector foil, at an active material loading of 18 $mg/cm^2$. $LiCoO_2$ is an intercalation compound with a capacity of 175 mAh/g, when cycled between 3 to 4.4V. The anode was a high-purity lithium metal foil pressed on a copper current collector foil. The cells were cycled between 4.4V and 3 V, and the first three formation cycles were done at a low 0.1 C rate (i.e., 10 hr charge, 10 hr discharge), for the system to attain equilibrium. The only difference between lithium/$LiCoO_2$ coin cell data presented in FIG. 5 versus FIG. 6 was the composition of the non-aqueous LiFSI in EC based electrolyte—the electrolyte in FIG. 6 contained perchlorate salt while the electrolyte in FIG. 5 did not. By introducing a small amount of $LiClO_4$ salt into LiFSI in EC electrolyte host, lithium/$LiCoO_2$ coin cell charged to 4.4V, passed the formation cycle, and, in addition the cycle life improved from 0 to >100. By comparing FIGS. 1 through 4, it is clear that LiFSI is more corrosive towards stainless steel (SS) than aluminum (Al). Because SS corrosion is even more severe in 2.0M LiFSI in EC compared to Al corrosion, when lithium/$LiCoO_2$ coin cell is fabricated using SS coin cell housing, the cell cannot pass the first formation cycle and it results in a flat voltage profile at 3.9V.

Figure 7:
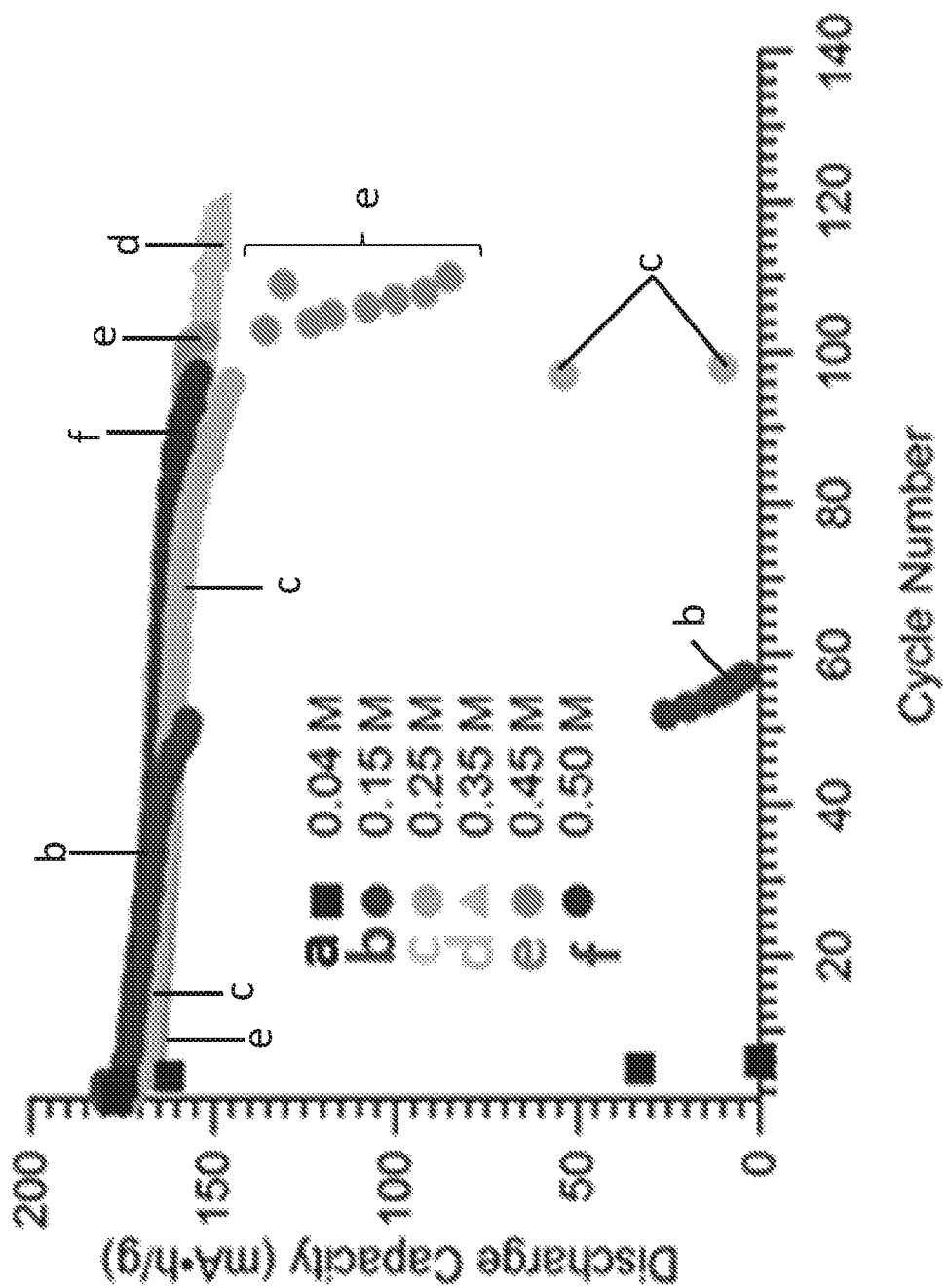
FIG. 7 is a discharge capacity vs. cycle number plot of lithium/$LiCoO_2$ coin cell employing LiFSI in EC electrolyte with different amount of $LiClO_4$, according to some aspects of the present disclosure.

FIG. 7 depicts a plot of discharge capacity versus cycle number in lithium/$LiCoO_2$ coin cell (Al-clad) employed with 2.0M LiFSI in EC with the addition of various amounts of $LiClO_4$ in the range of 0.04M (mol/L) to 0.50M (mol/L).

With (a) 0.04M addition, the cell can complete a formation step, however, the discharge capacity significantly decreased when a higher C rate was applied for regular cycling schedule. Curve (b) in FIG. 7 shows a discharge capacity curve when 2.0M LiFSI in EC+0.15M $LiClO_4$ was employed, and a significant improvement was made both as compared to 2.0M LiFSI in EC with no additive and as compared to curve (a). Curve (c) in FIG. 7 shows a discharge capacity curve when 2.0M LiFSI in EC+0.25M $LiClO_4$ was used. Curve (d) in FIG. 7 shows a discharge capacity curve when 2.0M LiFSI in EC+0.35M $LiClO_4$ was used. Curve (e) in FIG. 7 shows a discharge capacity curve when 2.0M LiFSI in EC+0.45M $LiClO_4$ was used. Curve (f) in FIG. 7 shows a discharge capacity curve when 2.0M LiFSI in EC+0.50M $LiClO_4$ was used. The composition of the electrolyte can be optimized based on the cell performance as shown in FIG. 7. Having too much of $LiClO_4$ (>0.5M $LiClO_4$) may enhance a chance of polymerization of EC at high voltage and cause undesirable side reactions.

The source of perchlorate anion ($ClO_4$) in the electrolyte to inhibit aluminum corrosion of cathode current collector at high voltage (4.4V) is not limited to $LiClO_4$. Other compositions may be used, for example, $Ca(ClO_4)^2$, $Sr(ClO_4)^2$, $Mg(ClO_4)^2$, and $Ba(ClO_4)^2$, and any combinations or mixtures thereof, including combinations and mixtures with $LiClO_4$, can also be employed. Combination(s) of more than one perchlorate salt additive can be employed without affecting electrochemical cell performance at a given testing schedule.

Figure 8:
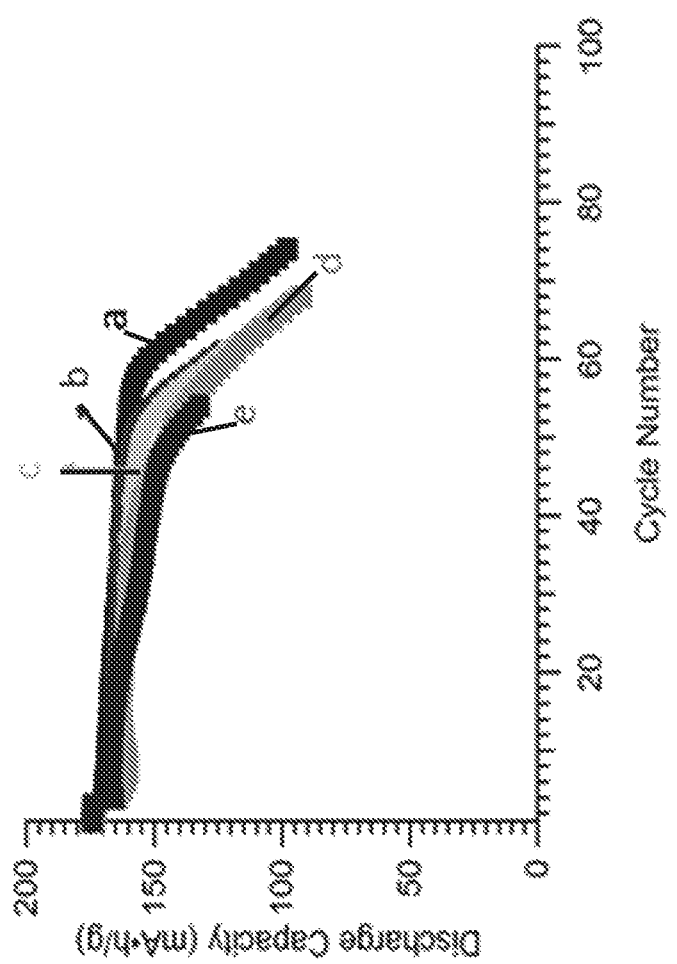
FIG. 8 is a discharge capacity vs cycle number plot of lithium/$LiCoO_2$ coin cell employing LiFSI in EC electrolyte with one, two, or three perchlorate salt(s), according to some aspects of the present disclosure.

FIG. 8 shows a discharge capacity versus cycle number plot of lithium/$LiCoO_2$ coin cell (Al-clad) adding (a) 0.35 M $LiClO_4$, (b) 0.35M $LiClO_4$+0.05M $Sr(ClO4)_2$, (c) 0.35M $LiClO_4$+0.05M $Ba(ClO_4)_2$, (d) 0.35M $LiClO_4$+0.0375M $Ba(ClO_4)_2$+0.0375M $Mg(ClO_4)_2$, and (e) 0.05M $Sr(ClO_4)_2$+0.05M $Mg(ClO_4)_2$, into the host electrolyte of LiFSI in EC. In some embodiments, uniform and non-dendritic plating of lithium can be achieved by adding, for example, 0.05M or 0.1M (or 0.05M-0.1M) alkaline earth metal salts into non-aqueous liquid lithium ion electrolyte. In some embodiments, alkaline earth metal salts include, for example, $Sr(ClO_4)_2$, $Ba(ClO_4)_2$, $Mg(ClO_4)_2$, and $Be(ClO_4)_2$. Incorporating a salt or an additive composed of perchlorate anion and a rare earth metal cation to a non-aqueous organic electrolyte employing LiFSI as the main salt can successfully improve cycling efficiency of a lithium ion electrochemical cell by suppressing corrosion of metal current collector at high voltage as well as by providing a more uniform lithium plating. When perchlorate salts with divalent cations are employed instead of $LiClO_4$ in non-aqueous electrolyte at concentrations exceeding 0.1M (mol/L), the lithium ion electrochemical cell may experience a capacity drop at high C rate (equal or above 0.7 C). In such a case, discharge capacity may return to normal in subsequent cycles, or it may stay at lower discharge capacity.

The electrolyte system can be adjusted for different applications of high energy density rechargeable lithium battery. The concentration of LiFSI salt, the concentration of perchlorate salts, and the non-aqueous solvent itself, may be modified for high energy density rechargeable lithium batteries for other applications with charging voltage up to 4.5V.

Electrolyte Composition

As discussed above, in some embodiments, the electrolyte includes a combination of two or more salts and one or more organic solvents. In some embodiments, one of the salts is an imide salt, for example, LiFSI. In some embodiments, a second salt is a perchlorate salt. In some embodiments, the solvent is or includes a cyclic carbonate (e.g., EC, propylene carbonate), a cyclic ether (e.g., THF, THP), a glyme (e.g., DME, DEOE, triglyme, tetraglyme), or an ether (e.g., DEE, DME), their derivatives, and any combinations or mixtures thereof. In some embodiments, the solvent consists essentially of EC, propylene carbonate, THF, THP, DME, DEOE, triglyme, tetraglyme, DEE, or DME, or their derivatives.

Imide salt concentration: By way of example, higher concentration of LiFSI increases the Li-ion transference number in electrolyte system, as discussed above. A high lithium-ion transference number can also reduce the effects of concentration polarization, thus decreasing this potential loss in a cell too. There are benefits of employing a high lithium salt concentration in the electrolyte, however, a high concentration also increases the liquid electrolyte viscosity that leads to a decrease in ionic conductivity of electrolyte. Generally, an electrolyte with low ionic conductivity will not support fast enough lithium ion mobility at high C rates. An electrolyte that is more viscous may be suitable for batteries that require lower C rate charging or discharging, or for batteries operated at high temperatures. In some embodiments, this high concentration salt electrolyte can benefit from having zero or little metal corrosion reaction (at room temperature) as it inhibits the dissolution of metal as it lowers the solubility of corrosion reaction product Perchlorate salt concentration: As provided in FIG. 7, the concentration of the perchlorate salt can be optimized for different battery electrolyte systems as the concentration of the perchlorate salt will depend on the solubility of the corrosion product in the electrolyte medium. As shown and explained in the description of FIG. 2 above, higher salt concentration electrolytes may require lower concentrations of perchlorate salt due to lowering of the solubility of the corrosion reaction product.

Non-aqueous solvent: the dielectric constant of the solvent plays a large role in determining the severity of metal corrosion at high voltage. Cyclic carbonates such as ethylene carbonate (EC) that exhibit high dielectric constant (i.e., 89.6 F/m), will have high solubility towards the corrosion reaction product. In some embodiments, cells employed with electrolytes based on solvents with low dielectric constant (e.g., DME having a dielectric constant of 7.2 F/m), on the other hand, may generally experience less metal corrosion. In some embodiments, metal corrosion is minimized with electrolytes having a high dielectric constant (e.g., EC) by using appropriate lithium imide salt concentration and perchlorate salt concentration. In some embodiments, metal corrosion is minimized with electrolytes having a low dielectric constant (e.g., EC) by using appropriate lithium imide salt concentration and perchlorate salt concentration. It has been surprisingly discovered that solvents with various dielectric constant values (e.g., low dielectric constant solvents such as DME, high dielectric constant solvents such as EC, or solvents with low to high dielectric constants) may be used in batteries as described herein by varying the amount of the lithium salt and the perchlorate.

The invention is illustrated in the examples that follow, which are provided for the purpose of illustration only and are not intended to be limiting of the invention.

EXPERIMENTAL EXAMPLES

Glass beaker cell experimentation via cyclic voltammetry and potentiostatic hold:

Three electrode glass beaker cell was prepared for cyclic voltammetry followed by potentiostatic hold electrochemical experiment to evaluate corrosion behavior of both aluminum (Al) and stainless steel (SS) in LiFSI-containing non-aqueous electrolyte solution with and without the addition of perchlorate salt. The cell preparation, electrochemical measurements, and data acquisition took a place in a glovebox filled with Argon ($O_2$<20 ppm, $H_2O$<1 ppm). High purity Al or SS foil (>99.99%) was fabricated to provide a flat exposed surface area of approximately 0.21 $cm^2$ and cleaned using acetone. Lithium foil (battery grade, >99.99%) was used as a reference electrode as well as a counter electrode. The corrosion behavior and corrosion potential of Al and SS was determined by continuous cyclic voltammetry followed by the corrosion rate measurement at constant voltage of +4.5V. In each cyclic voltammetry cycle, the voltage sweep was initially set to begin at an open circuit potential, then anodically scanned to +4.5V and reversed to +3V for 5 cycles at a scan rate of 1 mV/s. The working electrode was then swept from open-circuit voltage to +4.5V and held at +4.5V while the current and accumulated charge (coulomb) were recorded as a function of time.

Coin Cell Fabrication and Testing Conditions:

All cell components were pre-dried in heated in an anti-chamber of Argon (Ar) glovebox before being introduced into the working Ar glovebox, maintained at $O_2$<20 ppm and $H_2O$<1 ppm. The coin cell fabrication took a place in the Ar glovebox and the prepared cells were tested on galvanostatic battery cycler. Al-clad Hohsen 2032 (or MTI SS 2032) were assembled using commercial high voltage cathode $LiCoO_2$ (18 mg/$cm^2$ loading) on Al current collector, thin separator, thin lithium metal anode (in μm) on copper current collector, and non-aqueous electrolyte composed of LiFSI in organic solvent with and without perchlorate salt. The anode can be prepared, for example, by vapor-depositing a thin lithium layer (e.g., about 20 μm thickness) on a thin copper substrate (acting as current collector). On the first charge during formation, lithium ion from the $LiCoO_2$ cathode moves to the lithium anode and gets plated. The capacity of the cell was limited by the cathode and its specific capacity was calculated based on the active $LiCoO_2$ loading mass in the cathode materials. All the cells were formed prior to cycling. Formation cycle step included three cycles at constant current mode at 0.1 C/0.1 C charge/discharge rate between 4.4V and 3.0V. Regular testing schedule included a constant current-constant voltage mode (CCCV) and discharged at a constant current mode at 0.7 C/0.5 C charge/discharge rate in voltage range of 4.4V and 3.0V. Both the formation and the regular cycling were tested at room temperature.

Purity of LiFSI Salt:

The employed LiFSI salt has a high purity of >99.9% with water content below 50 ppm, measured with Karl Fischer. The halide and other metal cations impurities are measured via Ion Chromatography and the results are as follows: $F^-$<1 ppm, $Br^-$<1 ppm, $Cl^-$<1 ppm, $SO4^{2-}$<50 ppm, $Na^+$<20 ppm, $K^+$<20 ppm, $Mg^{2+}$<10 ppm, $Ca^{2+}$<10 ppm.

Concentration range of LiFSI salt in non-aqueous organic electrolyte solvent: 1.0M (mol/L) to 10.0M (mol/L).

Unless otherwise defined, used or characterized herein, terms that are used herein (including technical and scientific terms) are to be interpreted as having a meaning that is consistent with their accepted meaning in the context of the relevant art and are not to be interpreted in an idealized or overly formal sense unless expressly so defined herein. For example, if a particular composition is referenced, the composition may be substantially, though not perfectly pure, as practical and imperfect realities may apply; e.g., the potential presence of at least trace impurities (e.g., at less than 1 or 2%) can be understood as being within the scope of the description; likewise, if a particular shape is referenced, the shape is intended to include imperfect variations from ideal shapes, e.g., due to manufacturing tolerances. Percentages or concentrations expressed herein can represent either by weight or by volume.

Although the terms, first, second, third, etc., may be used herein to describe various elements, these elements are not to be limited by these terms. These terms are simply used to distinguish one element from another. Thus, a first element, discussed below, could be termed a second element without departing from the teachings of the exemplary embodiments. Spatially relative terms, such as "above," "below," "left," "right," "in front," "behind," and the like, may be used herein for ease of description to describe the relationship of one element to another element, as illustrated in the figures. It will be understood that the spatially relative terms, as well as the illustrated configurations, are intended to encompass different orientations of the apparatus in use or operation in addition to the orientations described herein and depicted in the figures. For example, if the apparatus in the figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly. Further still, in this disclosure, when an element is referred to as being "on," "connected to," "coupled to," "in contact with," etc., another element, it may be directly on, connected to, coupled to, or in contact with the other element or intervening elements may be present unless otherwise specified.

The terminology used herein is for the purpose of describing particular embodiments and is not intended to be limiting of exemplary embodiments. As used herein, singular forms, such as "a" and "an," are intended to include the plural forms as well, unless the context indicates otherwise.

It will be appreciated that while a particular sequence of steps has been shown and described for purposes of explanation, the sequence may be varied in certain respects, or the steps may be combined, while still obtaining the desired configuration. It should be understood that the order of steps or order for performing certain action is immaterial so long as the invention remains operable. Moreover, two or more steps or actions may be conducted simultaneously. Additionally, modifications to the disclosed embodiment and the invention as claimed are possible and within the scope of this disclosed invention.

Throughout the description, where articles, devices, and systems are described as having, including, or comprising specific components, or where processes and methods are described as having, including, or comprising specific steps, it is contemplated that, additionally, there are articles, devices, and systems of the present invention that consist essentially of, or consist of, the recited components, and that there are processes and methods according to the present invention that consist essentially of, or consist of, the recited processing steps.

The mention herein of any publication, for example, in the Background section, is not an admission that the publication serves as prior art with respect to any of the claims presented herein. The Background section is presented for purposes of clarity and is not meant as a description of prior art with respect to any claim.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

The invention claimed is:

1. A secondary high energy density lithium cell, comprising:
   a cathode comprising a high voltage cathode active material, wherein the cathode is capable of operating between 3V and 4.5V;
   an anode comprising an anode material, wherein the anode material is lithium metal; and
   a non-aqueous electrolyte, wherein the non-aqueous electrolyte comprises:
      an organic solvent selected from the group consisting of cyclic carbonates, glymes, cyclic ethers, ethers and combinations thereof,
      an imide salt with a fluorosulfonyl group, wherein the imide salt comprises LiFSI, and a perchlorate salt, wherein the perchlorate salt is selected from the group consisting of $LiClO_4$, $Ca(ClO_4)_2$, $Sr(ClO_4)_2$, $Mg(ClO_4)_2$, $Ba(ClO_4)_2$ and any combinations or mixtures thereof and the perchlorate salt has a pre-cycling concentration between 0.05M to 0.50M of the organic solvent, the perchlorate salt provided to form a passivation surface film on at least one of the anode and the cathode,
   wherein:
      the cathode and the electrolyte are electrochemically stable at operating voltages greater than 4.2V,
      the electrolyte has an imide salt concentration between 2 to 10 moles/liter of the organic solvent, and
      upon cycling, at least a portion of the perchlorate salt reacts with at least one of the anode and the cathode to form the passivation protective film.

2. The lithium cell of claim 1, wherein the imide salt consists essentially of LiFSI.

3. The lithium cell of claim 1, wherein the perchlorate salt comprises $LiClO_4$.

4. The lithium cell of claim 1, wherein the perchlorate salt has a concentration between 0.25M to 0.50M of the organic solvent.

5. The lithium cell of claim 1, wherein the perchlorate salt has a concentration between 0.35M to 0.45M of the organic solvent.

6. The lithium cell of claim 1, wherein the perchlorate salt comprises $LiClO_4$ and one or more perchlorate salts comprising an alkaline earth metal.

7. The lithium cell of claim 1, wherein the electrolyte comprises a cyclic carbonate selected from the group consisting of ethylene carbonate, propylene carbonate, their derivatives, and any combinations or mixtures thereof, as organic solvent.

8. The lithium cell of claim 1, wherein the electrolyte comprises a glyme selected from the group consisting of dimethoxyethane, diethoxyethane, triglyme, tetraglyme, their derivatives, and any combinations or mixtures thereof, as organic solvent.

9. The lithium cell of claim 1, wherein the electrolyte comprises a cyclic ether selected from the group consisting of tetrahydrofuran, tetrahydropyran, their derivatives, and any combinations or mixtures thereof, as organic solvent.

10. The lithium cell of claim 1, wherein the electrolyte comprises an ether selected from the group consisting of diethylether, methylbutylether, their derivatives, and any combinations or mixtures thereof, as organic solvent.

11. The lithium cell of claim 1, wherein the anode is a lithium metal foil pressed on a current collector.

12. The lithium cell of claim 1, wherein the anode is a current collector having a vapor-deposited lithium layer and lithium is subsequently plated on it during the first charge of the battery.

13. The lithium cell of claim 1, wherein the anode has lithium foil thickness ranging from 0.1 to 100 microns.

14. The lithium cell of claim 1, wherein the cell comprises at least one surface in contact with the electrolyte, the surface comprising aluminum, aluminum alloy, or stainless steel.

15. The lithium cell of claim 14, wherein the cell comprises an aluminum containing cathode current collector.

16. The lithium cell of claim 14, wherein the cell comprises a stainless steel containing form factor.

17. A method of operating a high energy density lithium cell, comprising:
   providing the high energy density lithium cell of claim 16; and
   cycling the cell at least once in a voltage range exceeding 4.2V.

18. The method of claim 17, wherein the cell is cycled at 0.7 C charge and 0.5 C discharge.

19. The method of claim 17, wherein cycling comprises cycling the cell to a voltage of 4.5V.

20. The method of claim 17, wherein the charging voltage is 4.5V.

21. The lithium cell of claim 11, wherein the current collector comprises a copper foil or mesh.

22. The lithium cell of claim 13, wherein the lithium foil thickness ranges from 5 to 50 microns.

23. The lithium cell of claim 1, wherein the high voltage cathode material is a metal oxide material that reversibly intercalates lithium ions at high electrochemical potentials.

24. The lithium cell of claim 23, wherein the high voltage cathode material has a general formula of $Li_xM_yO_z$, where M is a transition metal.

25. The lithium cell of claim 24, wherein the high voltage cathode material active material comprises a layered or a spinel oxide material selected from the group consisting of $LiCoO_2$, $Li(N_{1/3}Mn_{1/3}CO_{1/3})O_2$, $Li(Ni_{0.8}Co_{0.15}Al_{0.05})O_2$, $LiMn_2O_4$, $Li(Mn_{1.5}Ni_{0.5})_2O_4$ and lithium rich versions thereof.

* * * * *